No. 612,970. Patented Oct. 25, 1898.
J. W. KNAUSE.
COMBINED COLLAR BUTTON AND TIE RETAINER.
(Application filed Oct. 22, 1897.)
(No Model.)

WITNESSES.
Charles T. Hannigan.
Remington Sherman

INVENTOR.
John W. Knause.
by Geo. H. Remington & Co.
Atty.

UNITED STATES PATENT OFFICE.

JOHN W. KNAUSE, OF PROVIDENCE, RHODE ISLAND.

COMBINED COLLAR-BUTTON AND TIE-RETAINER.

SPECIFICATION forming part of Letters Patent No. 612,970, dated October 25, 1898.

Application filed October 22, 1897. Serial No. 656,089. (No model.)

*To all whom it may concern:*

Be it known that I, JOHN W. KNAUSE, a citizen of the United States, residing at Providence, in the county of Providence and State of Rhode Island, have invented certain new and useful Improvements in a Combined Collar-Button and Tie-Retainer; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In a patent of the United States issued to me on the 19th day of October, 1897, No. 591,978, I have shown and described a combined collar-button and tie-retainer possessing novel features.

My present invention also relates to a combined collar-button and tie-retainer; and it consists, essentially, of a front member and a back member and a connecting shank or link jointed to both the said front and back members, and further having the shank slidable on the said front member, whereby the button may be readily closed or collapsed, so as to occupy a small space, or it may be extended or opened to receive between the adjacent faces of the front and back members neckbands and collars varying greatly in thickness, all as hereinafter set forth and claimed.

Figure 1:
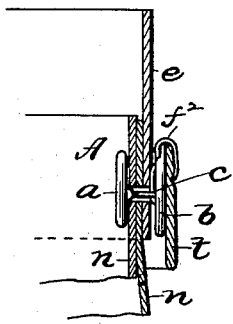
Figure 2:
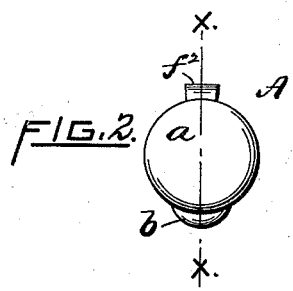
Figure 4:
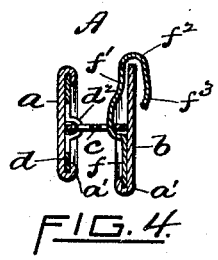
Figure 3:
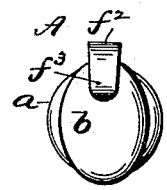
Figure 5:
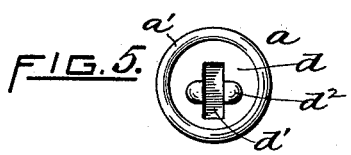
Figure 6:
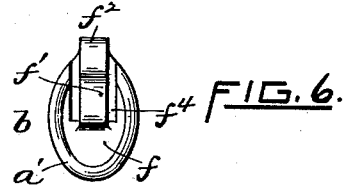
Figure 7:
Figure 8:
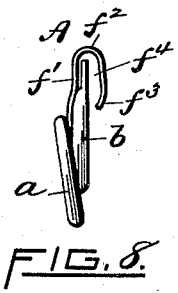
Figure 9:
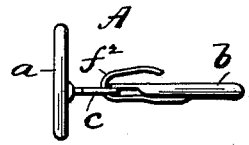

In the accompanying drawings, Figure 1 is a side elevation of my improved collar-button and tie-retainer located at the rear of the neck, as in use, the neckband, collar, and tie being in section. Figs. 2 and 3 are enlarged elevations viewed from the back and front of the device, respectively. Fig. 4 is a transverse central section taken on line $x\ x$ of Fig. 2. Figs. 5 and 6 represent the rear faces of the back and front members, respectively. Fig. 7 is a plan view of the connecting shank or link detached from the button. Fig. 8 is a side view showing the device fully closed or collapsed, and Fig. 9 is a side view showing the front member tipped and in position preparatory to being inserted through the neckband and collar.

My present improved collar-button and tie-retainer A—again referring to the drawings—is composed of the back member $a$, the front member $b$, and the interposed connecting-link $c$. The shape of the back $a$ may be round, while that of the front may be oval, substantially as shown, although they may have other forms.

I prefer to cover or face the parts $a$ and $b$ with celluloid or other suitable non-metallic material, substantially as shown.

The back $a$ consists of the flat metal disk $d$, having an elongated opening $d'$ therein and having the metal at each side of the opening swaged or bent outwardly at $d^2$ to form bearings for the two ears or trunnions $c'$ of the link $c$.

The front $b$ has secured to its rear side the metal plate $f$. This plate is provided with an upwardly-extending yielding tongue $f'$, which is bent over the top at $f^2$ and extends downwardly in front a short distance and terminates in the inwardly-bent end $f^3$, thus forming an inclosed space $f^4$ for the reception of a necktie. The sides of the plate $f$ contiguous to the tongue portion are cut away, as shown at $f^4$. The celluloid or covering material may be rolled over the outer edges of the plates $d$ and $f$, thereby firmly securing the latter in position, as indicated at $a'$.

$c$, Fig. 7, indicates the link or shank, arranged to be jointed to both the parts $a$ and $b$. One end of the link is provided with ears or trunnions $c'$, adapted to be held by and swing in the said bearings $d^2$ of the back-plate $d$. The other end of the link has an opening $c^2$ therein, adapted to freely receive the said tongue portion $f'$ of the front member of the button. By means of this construction the link is guided laterally, while at the same time permitting it to slide longitudinally of the part $f'$.

In producing my improved button A the parts $c$, $d$, and $f$ are first formed from suitable material or stock. The said parts $c$ and $d$ are then connected, after which the celluloid covering is applied to the plate $d$, thereby retaining the link in place and also forming the back member $a$. The tongue $f'$ of the celluloid-covered plate $f$ is then (before being bent to its final form) inserted into the link-opening $c^2$, followed by bending the said tongue outwardly and downwardly in front, as shown in Fig. 4, thus forming the front b and completing the operation.

By means of my invention it is obvious that the distance between the rear or adjacent faces of the front and back members may be varied, whereby the device is adapted to different thicknesses of collars and bands. Figs. 4 and 8 show the two extreme positions. The double hinge or joint renders the button automatically adjustable, the construction being such that the wearer can move his neck as desired without discomfort, since the button-back rests snugly and squarely against the neckband at all times. It will be seen, too, that the front member b can be readily tipped to a horizontal position in line with the connection c (see Fig. 9) and then easily inserted through the neckband n and collar e, followed by returning the front b to its normal position, the latter at the same time being pressed upwardly until the link rests, say, in the space at the bottom of the tongue f'. Afterward the tie t may be interposed or introduced under the hook or retainer portion of the tongue, all as clearly shown in Fig. 1.

I claim as new and desire to secure by United States Letters Patent—

1. As an improved article of manufacture, the combined collar-button and tie-retainer hereinbefore described, the same comprising front and back members b a, a link c interposed between and jointed to both the center portions of the inner or adjacent sides of said front and back members, and having the front member b provided in front with a downwardly-extending tongue arranged to form a tie-retainer, substantially as described.

2. The combination with the back member a and a link c jointed thereto, of the front member b provided with a tongue extending upwardly from its rear side and bent in front to form a tie-retainer, and having said link slidably mounted on the tongue, substantially as described.

In testimony whereof I have affixed my signature in presence of two witnesses.

JOHN W. KNAUSE.

Witnesses:
GEO. H. REMINGTON,
REMINGTON SHERMAN.